April 7, 1964 G. S. ALLIN, SR 3,127,970
DISC CLUTCH
Filed Nov. 7, 1960 4 Sheets-Sheet 1

*INVENTOR.*
GEORGE S. ALLIN, Sr.
BY
ANDRUS & STARKE
Attorneys

April 7, 1964

G. S. ALLIN, SR 3,127,970

DISC CLUTCH

Filed Nov. 7, 1960

INVENTOR.
GEORGE S. ALLIN, Sr.
BY
ANDRUS & STARKE
Attorneys

April 7, 1964

G. S. ALLIN, SR 3,127,970

DISC CLUTCH

Filed Nov. 7, 1960

*INVENTOR.*
GEORGE S. ALLIN, Sr.
BY
ANDRUS & STARKE
Attorneys

April 7, 1964 G. S. ALLIN, SR 3,127,970
DISC CLUTCH
Filed Nov. 7, 1960 4 Sheets-Sheet 4

*INVENTOR.*
GEORGE S. ALLIN, Sr.
*BY*
ANDRUS & STARKE
Attorneys

# United States Patent Office 3,127,970
Patented Apr. 7, 1964

3,127,970
DISC CLUTCH
George S. Allin, Sr., Green Bay, Wis., assignor to Northwest Engineering Corporation, Green Bay, Wis., a corporation of Wisconsin
Filed Nov. 7, 1960, Ser. No. 67,603
4 Claims. (Cl. 192—107)

This invention relates to a disc clutch of the type generally adapted for the operation of power shovels, cranes, draglines and the like where frequent clutch actuation and controlled clutch slippage gives rise to problems of distortion of clutch parts and of maintenance.

Clutches of this general heavy duty type require frequent replacement of the friction elements on the discs and for this purpose it has generally been necessary to disassemble the entire clutch and to reassemble it again, requiring a substantial shut down time for the entire machine.

Where former discs were constructed in segments they were left loose for centrifugal displacement against their mounting and which prevented axial release of the clutch during rotation of the drive hub and discs. Furthermore loose segments have proven to be subject to distortion that resulted in uneven wear and clutch actuation.

In carrying out the present invention the segments of the discs are rigidly secured together end to end leaving the discs free of centrifugal movement that would tend to bind the same in the mounting and prevent free floating of the discs axially of the clutch.

The clutch is comprised of alternate axially floating drive and driven discs disposed between an end drive disc and an opposite end driven disc which are relatively axially movable in opposite directions to engage the discs and close the clutch or to disengage the discs and open the clutch selectively.

The end discs are mounted on separate co-axial hubs which provide the drive and driven input and output members of the clutch, respectively. One of the hubs and its corresponding end disc are held fixed against axial movement while the other hub and its corresponding end disc are axially movable to actuate the clutch. One of the end discs is fixed rigidly to its corresponding hub while the other end disc is universally mounted on its corresponding hub to provide freedom of adjustment when the clutch is closed and opened.

Various details of the clutch construction are more specifically described hereinafter with reference to the accompanying drawings which illustrate the best mode presently contemplated of carrying out the invention.

Figure 1:
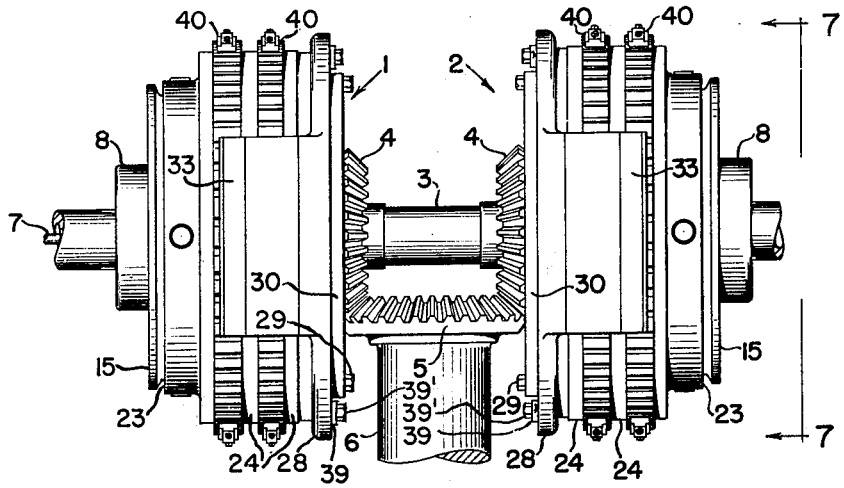
FIG. 1 is a plan view of a reverse shaft type disc clutch embodying the invention.

The reverse shaft type clutch illustrated in FIG. 1 comprises two separate clutches 1 and 2 mounted on a common drive shaft 3 and having corresponding output bevel gears 4 concentric with shaft 3 and which face each other to drive a common bevel gear 5 on a driven shaft 6 disposed normal to shaft 3.

The output of each individual clutch is coaxial with the input and is in the same rotational direction as the rotation of the drive shaft 3. By placing the clutches 1 and 2 on opposite sides of bevel gear 5 the latter may be rotated in either direction depending upon which clutch may be engaged at a given time.

The clutches 1 and 2 constitute a pair of forward and reverse drive clutches, and in order to prevent both driving at the same time they are disposed back to back and preferably actuated by a common longitudinally movable control rod 7 extending axially of drive shaft 3 and which is connected to the movable outer actuating ring 8 of each clutch by a radial arm 9 extending through a slot 10 in the hollow shaft 3.

Each clutch comprises a drive hub 11 and a driven hub constituted of the bevel gear 4 having a bushing 12 rotatably supporting the same on the shaft 3. The drive hub 11 is splined to shaft 3 to drive the same rotationally therewith while providing longitudinal movement of the hub upon the shaft. For this purpose the actuating ring 8 is threaded on the end of the corresponding hub 11 to move the same by axial movement of rod 7.

The driven hub 4 is journalled on shaft 3 to rotate therewith when the clutch is engaged and to remain stationary thereon when the clutch is released. Where forward and reverse clutches are provided as shown in FIG. 1, the driven hub 4 of the clutch that is released will be rotated by gear 5 in a direction opposite to shaft 3 when the other clutch is engaged.

Each clutch is of the multiple disc type, having alternate circular drive discs and circular driven discs which are disposed for relative axial movement into and out of engagement.

The outer end drive disc 13 is removably mounted on hub 11 to rotate and move axially therewith.

The mounting of disc 13 is universal to permit the disc to have free angular movement within predetermined limits on any transverse axis normal to the axis of drive shaft 3.

For this purpose hub 11 carries two diametrically opposed radial brackets 14 to which an intermediate mounting ring 15 is pivoted by corresponding radial aligned pins 16 having tapered portions 17 seated in the brackets 14 and secured therein by corresponding nuts 18 threaded on the inner ends of the pins. The pins 16 extend into corresponding aligned bearing openings in ring 15 and thereby mount the latter for pivotal movement on the axis of the pins which is transverse to shaft 3.

The ring 15 has two diametrically opposite brackets 19 to which the disc 13 is pivotally attached by corresponding radial aligned pins 20 having tapered portions 21 seated in the brackets 19 and secured therein by corresponding nuts 22 threaded on the inner ends of the pins. The pins 20 extend into corresponding aligned bearing openings in flange lugs 23 on disc 13 and thereby mount the latter for pivotal movement on the axis of pins 20 which is transverse to shaft 3.

By disposing the axis of pins 20 at approximately 90° from the axis of pins 16 the disc 13 is free to move universally to adjust itself for compensation of varying thicknesses of the several discs of the clutch.

The remaining circular drive discs 24 are carried by three equally spaced radial arms 25 extending from hub 11 and are interlocked therewith by gear segments 26 on the arms which intermesh with corresponding circumferentially spaced complemental sets of gear teeth 27 on the inner edge of the discs. The segments 26 and teeth 27 serve to drive the discs 24 rotationally with hub 11 and also provide for axial floating of discs 24 when hub 11 is moved longitudinally to actuate or release the clutch.

The innermost end driven disc 28 is removably secured by bolts 29 to a segment carrier 30 which is in turn fastened to hub 4 by bolts 31 and serves to drive the hub. The remaining driven discs 32 are disposed alternately between discs 13 and 24 and are free floating axially of the clutch.

The floating discs 32 are held in position concentrically of the other discs by a pair of diametrically opposed arms 33 rigidly carried by the inner end disc 28 fixed to segment carrier 30 and which arms have inner teeth 34 extending parallel to the axis of the clutch and intermeshing with corresponding gear teeth 35 on the outer edge of the floating disc 32. The teeth 34 and 35 compel rotation of arms 33, inner disc 28, segment carrier 30 and driven hub 4 with the floating discs 32, and also provide for axial movement of the floating discs 32 relative to each other and to the axially fixed inner disc 28 during clutch actuation.

Actuation of the clutch by rod 7 pulling hub 11 in a direction moving outer driving disc 13 toward inner driven disc 28 effects clutching engagement of the discs whereby hub 4 is driven rotationally from the constantly rotating drive hub 11. Pushing of rod 7 in the opposite direction moves hub 11 to release the clutch by moving outer disc 13 away from inner disc 28 and permitting the floating discs 24 and 32 to separate, thereby breaking the driving connection through the discs so that hub 4 is no longer rotated by hub 11.

The driven discs 28 and 32 are lined on the operative sides with facing material 36 which may be secured thereto by suitable countersunk rivets 37 to constitute a part of the discs. The material 36 is generally wear resistant and provides a friction face for engagement with adjacent discs 13 and 24 and effecting the clutching action.

In order that new lining can be applied to the discs 28 and 32 without disassembling the entire clutch each disc is formed or cut into segments, those shown each having two semi-circular segments with the arms 33 disposed at approximately 90° from the diametric line of separation of the segments.

The inner disc 28 has its segments bolted to carrier 30 and the corresponding meeting ends of the two segments are retained radially by a ring-shaped dowel 38 which is held in a complementary circular groove in the two segments by an overlying plate 39 removably secured at its ends to the corresponding segments as by bolts 39'.

Figure 5:
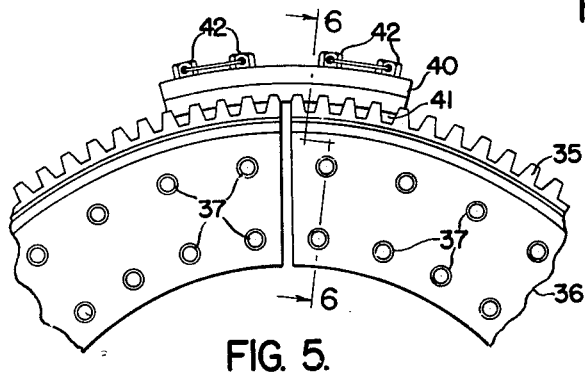
FIG. 5 is an enlarged fragmentary elevation of a driven disc showing the joint between two segments.
Figure 6:
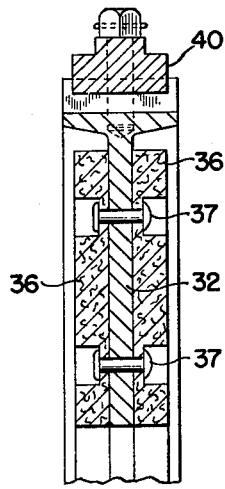
FIG. 6 is a further enlarged transverse section taken on line 6—6 of FIG. 5.
Figure 7:
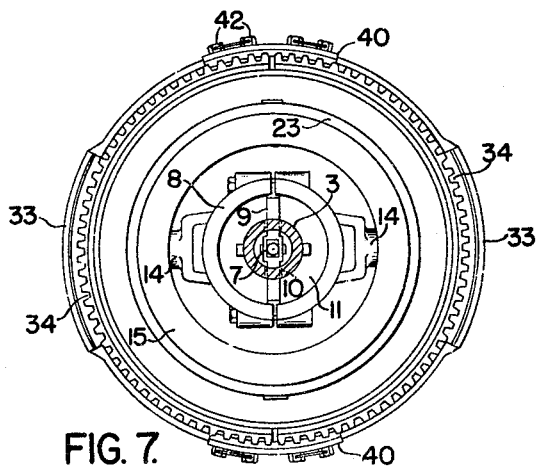
FIG. 7 is an end elevation of the clutch taken on line 7—7 of FIG. 1, and with the drive shaft sectioned.
Figures 2, 8:
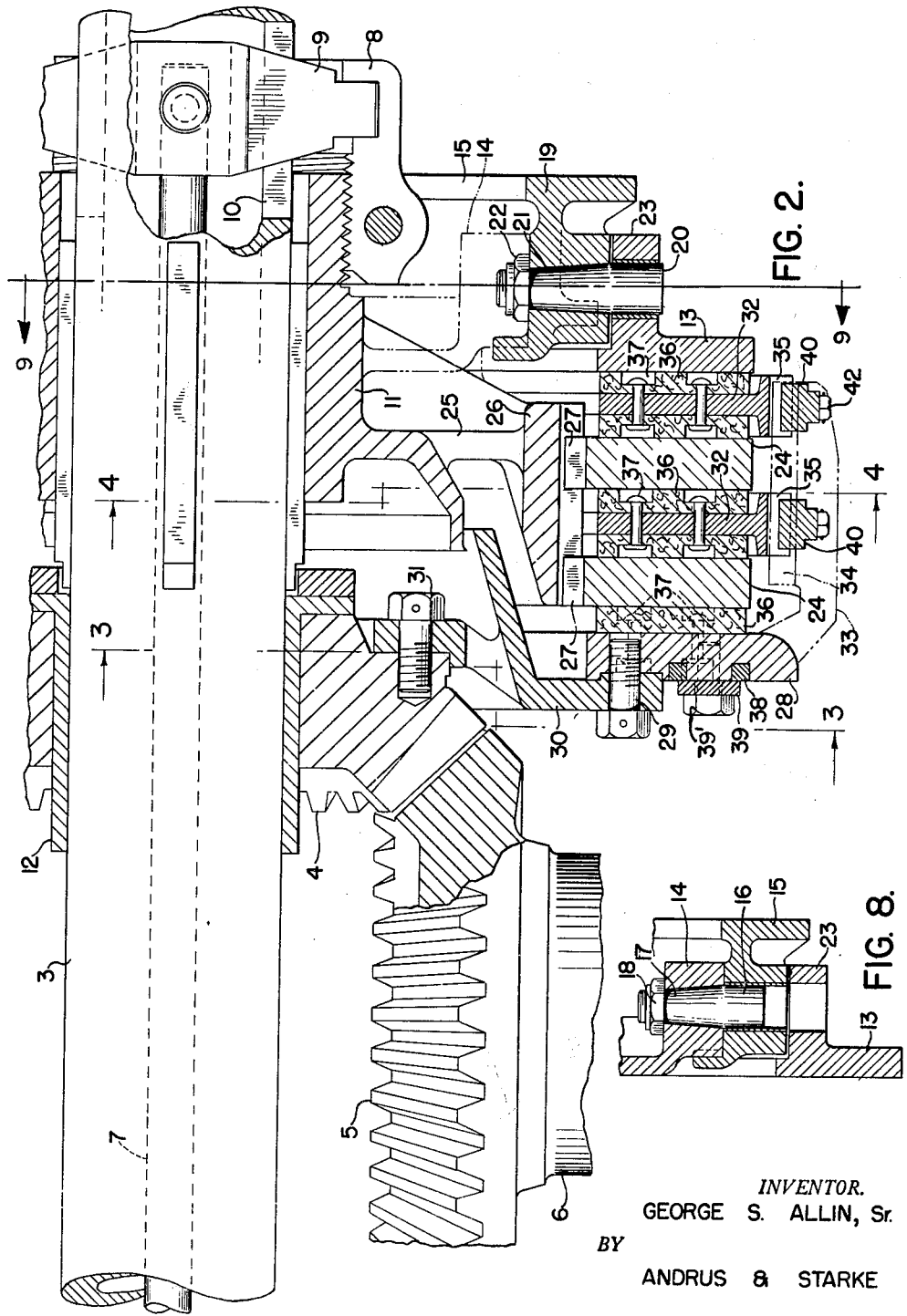
FIG. 2 is a fragmentary enlarged horizontal axial section of the right-hand clutch of FIG. 1 with the clamp arm and the radial brackets of the drive hub in phantom.
FIG. 8 is a fragmentary transverse section through the outer end of the clutch on a 90° plane to FIG. 2 illustrating the connection of the drive hub to the mounting ring supporting the outer end drive disc.
Figure 4:
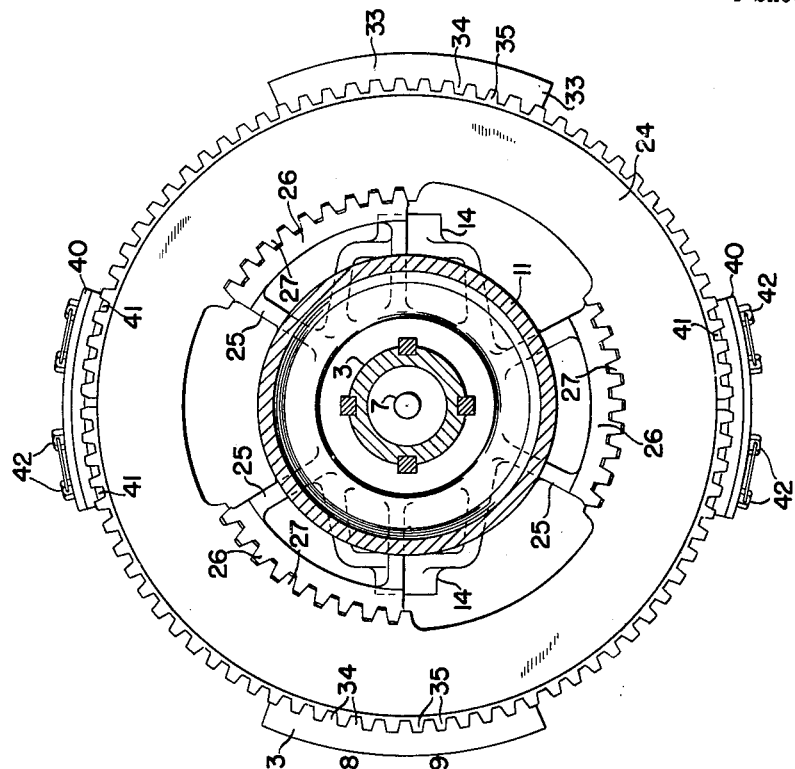
FIG. 4 is a reduced transverse section taken on line 4—4 of FIG. 2.
Figure 3:
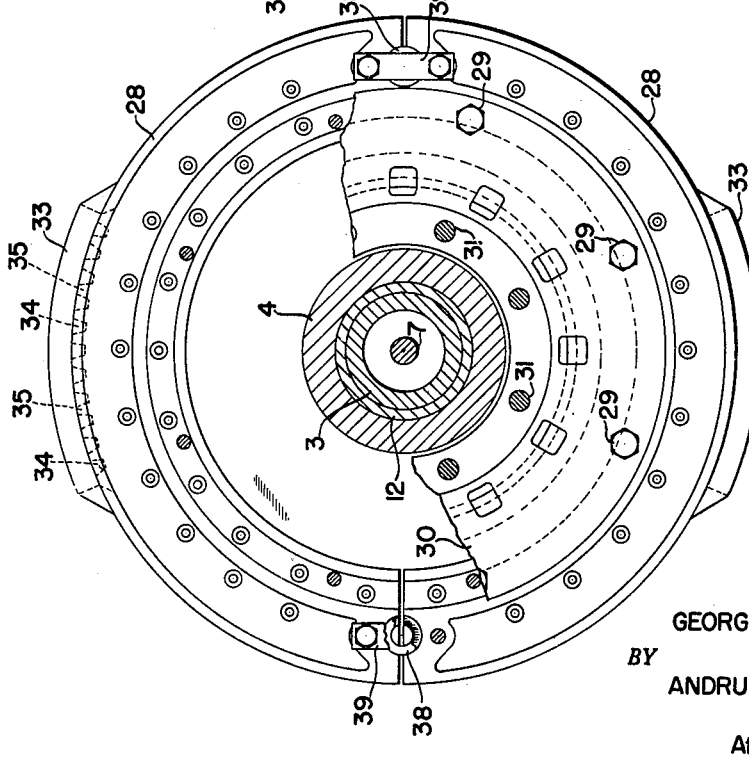
FIG. 3 is a reduced fragmentary transverse section taken on line 3—3 of FIG. 2 with part of the hub broken away.
Figure 9:
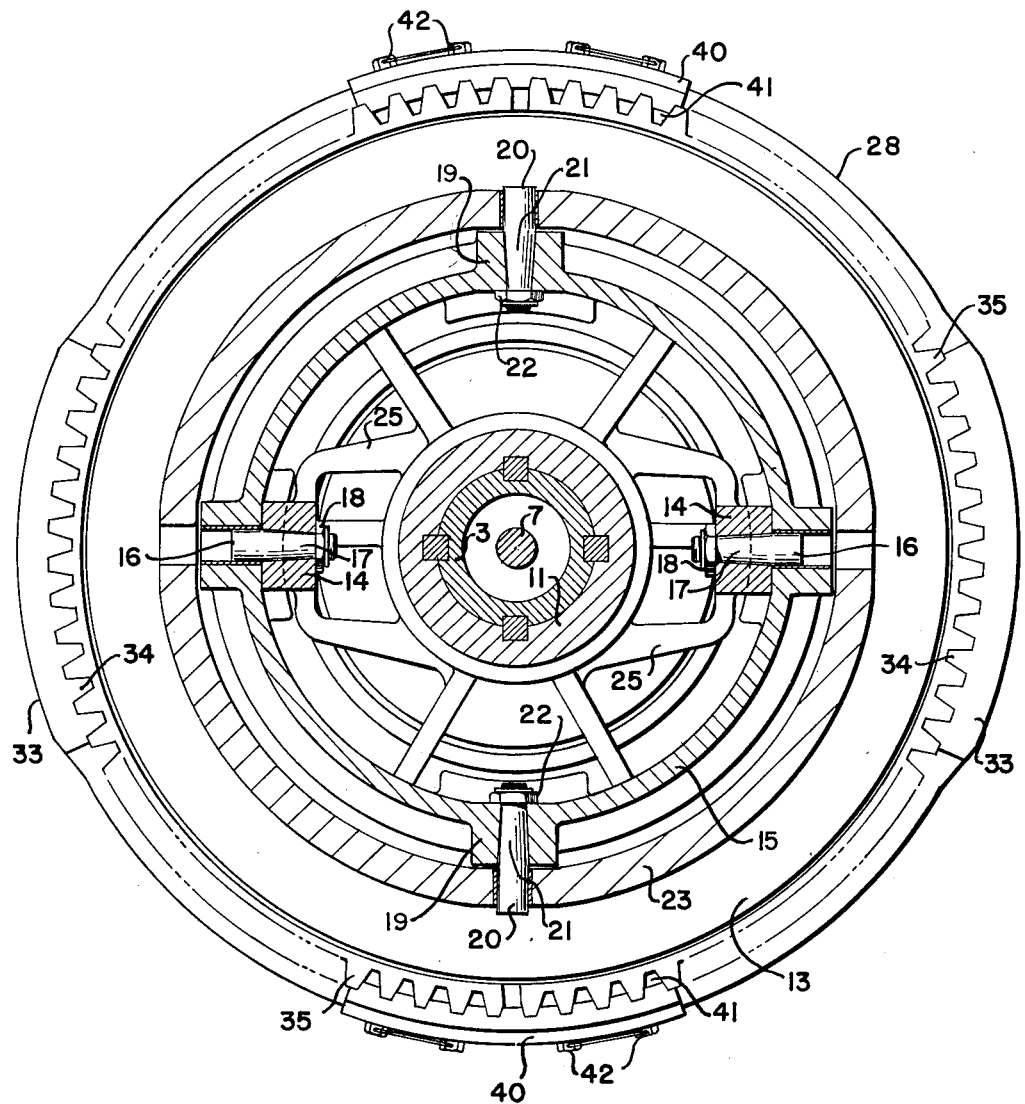
FIG. 9 is a transverse section taken on line 9—9 of FIG. 2.

The remaining floating discs 32 have their segments secured rigidly together by connecting blocks 40 applied across the gap between the corresponding segment ends and interlocked with the segments as by intermeshing of teeth 41 on the inner surface of the blocks and teeth 35 on the outer edges of the discs as shown in FIG. 5. Suitable bolts 42 secure the blocks 40 to the segments and retain the discs in rigid circular shape.

Each disc 32 may be initially constructed as a circular integral unit and machined as required, and then severed diametrically to provide the two separable segments thereof. Since the teeth 35 will have been machined as on a circular piece, the teeth 41 on blocks 40 will secure the segments in exact complemental position to provide the circular disc.

With the construction described only the driven discs 28 and 32 need be removed for replacing the lining 36 thereon. This can be accomplished readily by unbolting the plate 39 and removing dowel ring 38 to free the segments of the inner end disc 28 from each other, unbolting the inner disc 28 from carrier 30 and then lifting the segments of the inner disc 28 with the arms 33 thereon outwardly of the clutch; and removing bolts 42 to free the segments of the floating discs 32 from each other, followed by lifting of the segments of the floating discs 32 outwardly from between the adjacent driving discs.

The discs 28 and 32 are then re-lined with new facing material 36 by separately lining each of the disc segments as needed whereupon the discs are re-assembled in the clutch by a reverse of the above described removal process. In the invention, any variations occurring in the thickness of the facing material on corresponding faces of the segments comprising any particular disc are automatically compensated for by the universally adjustable end drive disc 13.

In order to facilitate the assembly and disassembly of discs 32, the segments of the discs are preferably limited to two in number so that they may be readily separated or closed together.

The drive discs 13 and 24 need not be disturbed in the process of removing and re-inserting discs 28 and 32.

By reason of the fact that the segments of discs 32 are rigidly clamped together by blocks 40 the discs are in effect rigid and as though in one piece. Consequently, they do not expand outwardly by centrifugal forces into engagement with arms 33 and there is no binding between the meshing teeth 34 and 35 on the arms 33 and discs 32 respectively that would tend to interfere with the free actuation of the clutch. All of the clutch discs are free to separate upon release of the clutch and clutch slippage will effect more uniform wear on all the discs.

Various modes of carrying out the invention are contemplated as being within the scope of the following claims particularly pointing out and distinctly claiming the subject matter which is regarded as the invention.

I claim:

1. In a multiple disc structure of the class described having alternate discs lined with friction material for engagement with corresponding faces of the remaining discs, a construction for said alternate lined discs each of which comprises circumferentially spaced segments providing a line of separation between adjacent segments, removable means bridging the line of separation between said segments to secure said separate segments of each disc rigidly together to provide the corresponding discs, and external clamping means carried by one of said segmental discs and interlocking with the other segmental discs to position the same concentrically with respect to said other discs, said clamping means being removable along with said one segmental disc to provide for removal of said other lined disc segments from the structure after removal of said securing means.

2. In a device of the class described having relatively rotatable sets of alternate discs carried by corresponding axially aligned hubs with relatively movable end discs axially and rotationally fixed to the corresponding hubs and with intermediate discs freely floating axially therebetween; a mounting for one of said end discs upon its hub comprising an intermediate support ring, means pivotally mounting said ring on the hub on a transverse pivot axis substantially normal to the axis of the device, means pivotally mounting said one end disc on said support ring on a transverse pivot axis substantially normal to the axis of the device and to said first named transverse pivot axis to provide for universal adjustment of said one end disc to variations in the thickness of the stack of alternate discs.

3. The invention as set forth in claim 1 wherein the removable means bridging the line of separation between adjacent segments to secure the segments rigidly together comprises a member having interlocking teeth engaging complementary teeth on the outer circumference of said segments.

4. The invention as set forth in claim 1 wherein the external clamping means carried by one of said segmental discs includes interlocking teeth engaging complementary teeth on the outer circumference of said other segmental discs to provide for transmission of rotary forces to and from said other discs and for free axial movement of said other discs at all times within the clutch.

References Cited in the file of this patent

UNITED STATES PATENTS

| | | |
|---|---|---|
| 1,132,216 | Rogers | Mar. 16, 1915 |
| 1,143,076 | Scofield | June 15, 1915 |
| 1,790,400 | Birkigt | Jan. 27, 1931 |
| 1,940,947 | Hand | Dec. 26, 1933 |
| 2,159,326 | Harwood et al. | May 23, 1939 |
| 2,423,881 | Du Bois | July 15, 1947 |
| 2,610,719 | Hornbostel | Sept. 16, 1952 |
| 2,633,217 | Carlson | Mar. 31, 1953 |
| 2,714,437 | Spase | Aug. 2, 1955 |
| 2,913,081 | Rudisch | Nov. 17, 1959 |